Nov. 10, 1931.  J. S. STEWART  1,831,041
SPRING TOOTH HARROW
Filed April 4, 1930   2 Sheets-Sheet 1
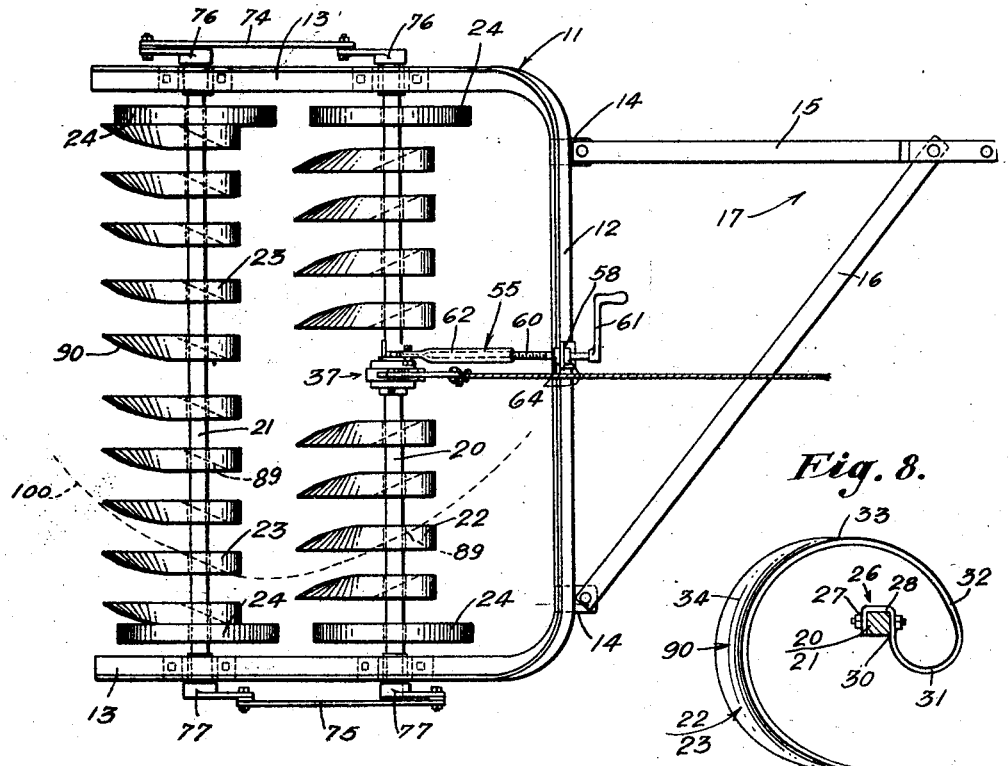
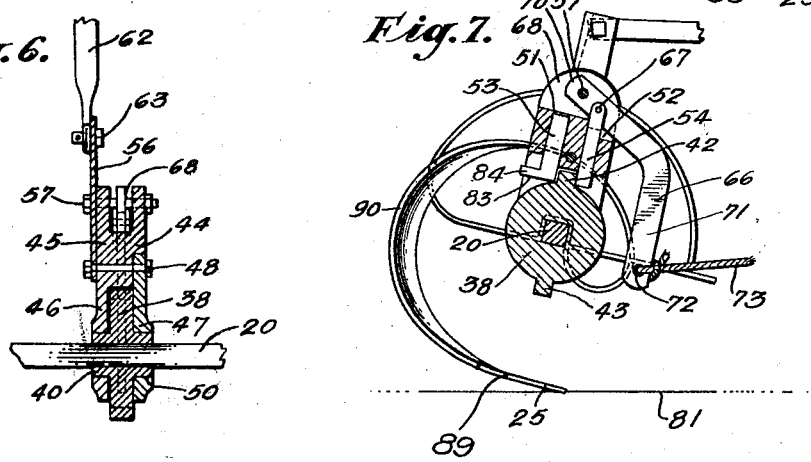
INVENTOR.
James S. Stewart
By
ATTORNEY.

Nov. 10, 1931.  J. S. STEWART  1,831,041
SPRING TOOTH HARROW
Filed April 4, 1930  2 Sheets-Sheet 2
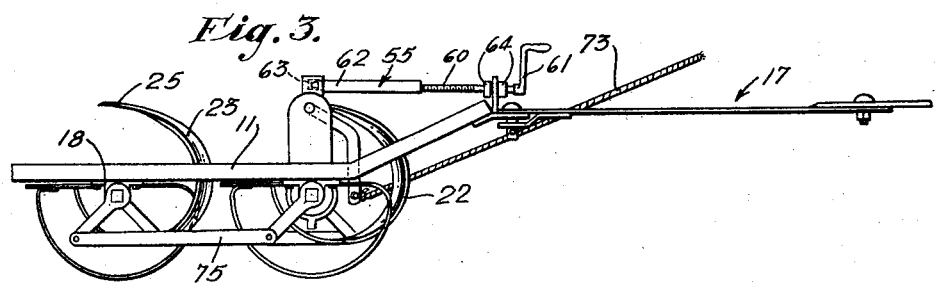
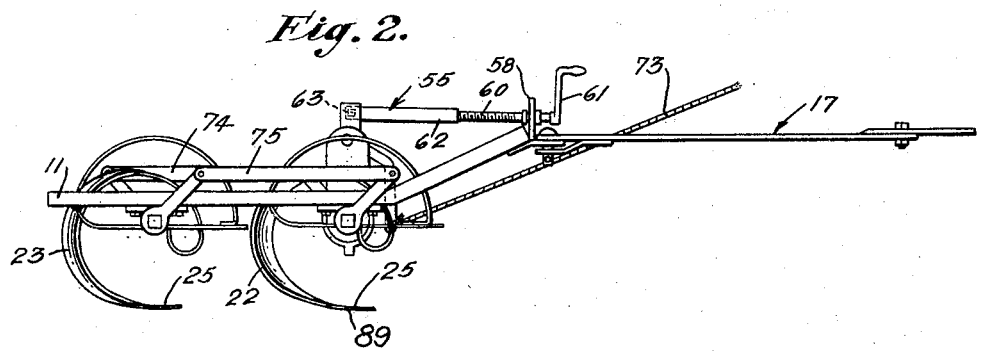
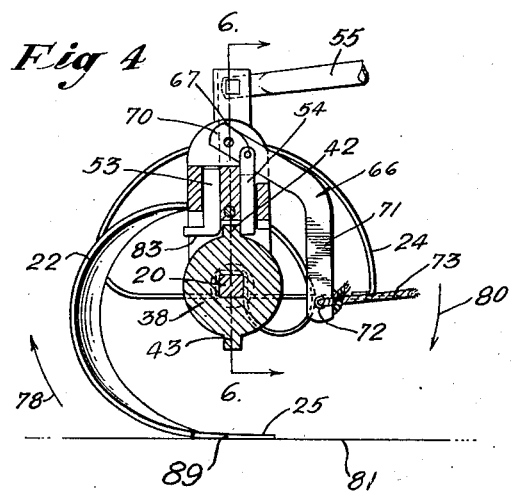
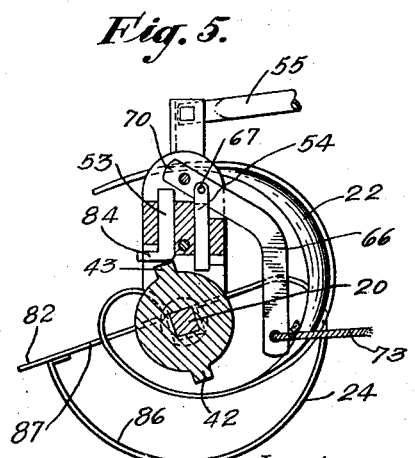
INVENTOR:
James S. Stewart
By
ATTORNEY.

Patented Nov. 10, 1931

1,831,041

UNITED STATES PATENT OFFICE

JAMES S. STEWART, OF OXNARD, CALIFORNIA, ASSIGNOR TO BRENNEIS MANUFACTURING COMPANY, OF OXNARD, CALIFORNIA, A CORPORATION OF CALIFORNIA

SPRING TOOTH HARROW

Application filed April 4, 1930. Serial No. 441,539.

My invention relates to the mechanism of agricultural implements, and relates particularly to a harrow embodying such mechanism.

Devices such as harrows are extensively used in cultivating the soil, either for the purpose of preparing it for planting or for keeping the soil in a loose and finely divided condition to prevent vaporization of water from the soil and to maintain a maximum of aeration. For purposes such as above indicated spring tooth harrows are employed. Naturally, the teeth of these harrows pick up refuse materials such as weeds, sticks, etc., and carry such materials along therewith. To enable the dumping of the accumulated materials it is customary to mount the teeth of the harrow so that they may be released and swung rearwardly and upwardly to drop the accumulations therefrom. Harrows of this type are frequently equipped with means for returning and locking the harrow teeth in operative position, such means being frequently actuated in consequence of the backing up of the draft device or tractor which is employed to pull the harrow.

My invention comprehends a harrow of simple form which may be very cheaply constructed and yet fully effective in its operation, having harrow teeth which may be released so as to swing rearwardly and upwardly in order to discharge accumulations of trash therefrom, and having means for automatically returning the harrow teeth to ground-engaging position without the necessity of backing the vehicle from which the harrow is pulled.

It is an object of the invention to provide a harrow having harrow teeth mounted on a rotatable member and means for releasing the rotatable member so that the harrow teeth may pass through a complete revolution so as to first drop the accumulation of trash and then move into operative position, all of which is accomplished during the forward movement of the harrow.

A further object of the invention is to provide means for supporting the frame of the harrow during the time the harrow teeth are in retracted position, this means coming automatically into supporting position during the time the harrow teeth are retracted.

It is a further object of the invention to provide a simple form of mechanism for controlling the harrow teeth, and a simple means for actuating this control mechanism to accomplish rotation of the harrow teeth from operative position, through retracted position, and back again to operative position.

A further object of the invention is to provide a harrow having a horizontal shaft rotatably mounted on a harrow frame, a complement of harrow teeth extending downwardly from the shaft, and cooperative supporting members extending upwardly from the shaft so that when the shaft is released and the harrow teeth rotate rearwardly, the supporting means will rotate forwardly into engagement with the earth's surface and support the harrow frame during the time the harrow teeth are retracted.

A further object of the invention is to provide a simple form of latch means for controlling the positioning and rotation of the harrow teeth and supporting means on the shaft member of the harrow.

A further object of the invention is to provide a harrow having teeth so formed that the harrow will swing into offset trailing position behind the power device by which it is drawn.

A further object of the invention is to provide an improved spring harrow tooth which may be employed in ordinary harrow construction and also in my improved automatic harrow construction set forth in this application.

Further objects and advantages of the invention will be made evident hereinafter.

Referring to the drawings which are for illustrative purposes only:

Fig. 1 is a plan view of a harrow embodying my present invention.

Fig. 2 is a side elevation of the harrow with the harrow teeth thereof in operative or earth-engaging position.

Fig. 3 is a side elevation of the harrow similar to Fig. 2, but showing the harrow teeth in retracted position and the intermediate or auxiliary supporting members in engagement with the ground.

Fig. 4 is an enlarged, vertical cross section through the latch and control device of the invention.

Fig. 5 is a vertical cross section similar to Fig. 4, showing the latch and control mechanism during the operation thereof.

Fig. 6 is a fragmentary section on a plane represented by the line 6—6 of Fig. 4.

Fig. 7 is a cross sectional view similar to Figs. 4 and 5, showing how the latch and control mechanism may be employed to adjust the earth-engaging positions of the harrow teeth.

Fig. 8 is an elevational view employed in disclosing my new form of spring tooth for harrows.

As shown in Figs. 1, 2 and 3, a preferred form of my harrow may include a frame 11 consisting of a structural angle bent to U-shape form so as to provide a front extension 12 and rearwardly extending legs 13. By means of clips 14 the bars 15 and 16 of a draft member 17 may be secured to the front extension 12 of the frame 11, it being evident that the draft member 17 may be either of offset or centralized construction, as may be desired. By means of bearing members 18, front and rear shafts 20 and 21 are secured in horizontal positions across the legs 13 of the frame 11. Along the shafts 20 and 21 harrow teeth 22 and 23 are secured, and in spaced relationship on the shaft intermediate supporting member 24 are secured in positions diametrally opposite from the points 25 of the harrow teeth 22 and 23. It is preferable to place the members 24 near the ends of the shafts 20 and 21, but where the shafts are of considerable length, intermediate supporting members 24 may be placed near the center of the shaft.

As shown in Fig. 8, the harrow teeth 22 and 23 are made of spring form and each includes an inner portion 26 of inverted U-shape form and consisting of a rear extension 27, a top extension 28, and a front extension 30, bent up from tool steel in the manner customarily employed in working of metals. Extending downwardly from the front extension 30 and in continuation thereof, is a curved portion 31 of the spring tooth which curves forwardly and then upwardly and rearwardly as indicated at 32 and 33 over the top of the shaft 20 or 21 and thereafter curves downwardly across the rear of the shaft, as indicated at 34, and forwardly as indicated at 35, so as to end in a point 25. The old construction of spring teeth for harrows consists of a bar or strip of steel which extends either upwardly or rearwardly from its point of attachment with the bar on which it is mounted and is, therefore, of relatively short length. In order to provide harrow teeth of this construction with sufficient length of metal to give them the required flexibility so that they will not be readily broken, it is customary to make the spring teeth of relatively large diameter. It will be perceived that my new spring tooth extends over the top of the bar 30 and has a front loop portion, as indicated at 31, disposed ahead of the bar. In this new construction the thrust of the bar or shaft is received by this flexible loop portion and is then transmitted to the point 25 of the tooth through the remainder of the metal strip constituting the spring tooth. This new construction is superior in its flexibility and durability to spring teeth of approximately the same size made in accordance with the old practice.

On one of the shafts of the harrow, such as the front shaft 20, a latch and control device 37 is mounted; this device 37 may be placed at any position along the shaft 20, either in the center thereof as shown, or otherwise as best practice may dictate, this latch and control device consisting of a primary member or rotary disk 38 having a hub 40 with an opening therethrough to fit the shaft 20, and upwardly and downwardly extending lugs or projections 42 and 43. Secured in cooperative position relative to the latch disk 38 is a secondary or stationary latch member 44, consisting preferably of a body 45 having a downwardly extending leg 46 integrally formed on one side thereof, and a detachable leg or plate 47 adapted to be secured to the opposite side thereof by a bolt 48. The legs or plates 46 and 47 straddle the latch disk 38 and are bored as indicated at 50 to receive the opposite ends of the hub 40 which is formed on the latch disk 38. In the body 45 track or slide means are provided in the form of vertical openings 51 and 52 adapted to receive stop bars 53 and 54 in such spaced relationship that the lower ends thereof will engage opposite faces of the lug 42, as shown in Fig. 4. When the lug 42 is disposed between the lower ends of the bars 53 and 54 the body 45 and the latch disk 38 are locked against relative movement. Rotation of the body 45 on the axis of the shaft 20 is prevented by an adjustable member 55 which extends forwardly from an angle member 56 secured to the body 45 by bolts 48 and 57 to an upwardly projecting plate 58 secured to the front extension 12 of the harrow frame 11. The adjustable means 55 includes a screw 60 which extends through the plate 58 and has a handle 61 thereon, as shown in Figs. 1, 2 and 3. This screw 60 threads into a tubular member 62 which is flattened at its rearward end for the purpose of engaging a pin 63 by which it is connected to the member 56. Collars 64 are secured on the screw 60 on opposite sides of the plate 58 for preventing axial movement of the screw, with the result that when the screw is rotated by means of the handle 61 the tubular member 62 will move forwardly or rearwardly, depending upon the direction of rotation of the screw 60. As shown clearly in Figs. 4, 5 and 7, the upper end of the bar 54 is secured to an operating lever 66 by use of a pin 67. The operating lever 66 is hinged on the bolt 57 which extends across an opening 68 in the upper end of the body 45. The operating lever 66 includes a rearwardly extending portion 70 which projects into the path of movement of the bar 53 for a purpose which will be hereinafter described. The forward end 71 of the lever 66 extends downwardly in the manner shown and is provided with a hole 72 at its lower end from which a rope 73 or other pull means may be extended to the tractor or other vehicle by which the harrow is pulled. In Figs. 1, 2, and 4 the teeth of the harrow are shown in operative position, or in other words, extending downwardly for engagement with the ground. The front harrow teeth 22 are held in this position due to the engagement of the projection 42 by the stop bars 53 and 54, and the harrow teeth 23 are held in this position by links 74 and 75 extended between the outer ends of cranks 76 and 77, which are mounted on the ends of the shafts 20 and 21. The cranks 76 and 77 and the links 74 and 75 are angularly offset so that the shaft 21 is caused to rotate with or remain stationary with the shaft 20. Assuming that the harrow, as shown in Fig. 2, is being pulled forwardly and has accumulated in the teeth thereof materials which are to be dumped, the dumping operation may be then accomplished by the driver or operator pulling on the rope 73 so as to rotate the lever 66 upwardly and lift the stop bar 54 from its position of engagement with the front face of the projection 42, as shown in Fig. 4. This release of the lug or projection 42 permits the disk 38, the shafts 20 and 21, the harrow teeth 22 and 23, and the supporting members 24 to rotate in forward direction from the relative positions indicated in Figs. 2 and 4.

Referring to Fig. 4, as the harrow teeth rotate rearwardly and upwardly, as indicated by arrow 78, toward retracted positions, the intermediate supporting member 24 will rotate downwardly as indicated by arrow 80 toward a position of engagement with the ground or surface 81. Therefore, when the harrow teeth are in the position to leave the surface 81, projections 82 on the forward ends of the supporting members 24 will engage the ground so that as the forward motion of the harrow is continued, the supporting members 24 will be rolled toward the positions indicated in Fig. 5, and the harrow teeth will assume the retracted positions also indicated in Fig. 5. As the projection 43 of the latch disk 38 approaches vertical position it will engage a relatively sloping approach or face 83 provided by an extension or toe 84 which projects rearwardly from the lower end of stop bar 53, and will lift the stop bar 53 in the manner indicated in Fig. 5, whereupon it will engage the stop bar 54. When the stop bar 53 is raised by the lug 43 it moves toward the rearward projection 70 of the operating lever 66, and if the lever 66 has not dropped into normal position so as to return the stop bar 54 to lowered position, the engagement of the projection 70 thereof by the upper end of the stop bar 53 will cause clockwise rotation of the lever 66 and the return of the stop bar 54 to downward position before the lug 43 has reached a position for engagement with the lower end of the stop bar 54. The cooperation of the lug 43 with the stop bars 53 and 54 will then hold the rotatable parts of the harrow in the relative positions in which they are shown in Fig. 3, the supporting members 24 being in downwardly projecting positions so as to engage the ground and support the frame in raised position, making it possible to move the harrow forwardly any desired distance with the teeth thereof in raised or retracted position as shown. When it is desired to throw the harrow teeth into ground-engaging or operative position, the rope 73 may be again pulled so as to accomplish the releasing of the latch mechanism whereby to permit rotation of the shafts 20 and 21 and their cooperative parts through an angle of 180°.

In the preferred form of my invention the supporting members 24 are made in the form of wheel segments, or in other words, substantially one-half of a complete wheel. It is convenient to make these wheel segments from flat steel bars bent so as to provide a curved portion 86 extending through an arc of substantially 180°, and a flat diametral portion 87 which is secured to a shaft such as the shaft 20 of Fig. 5.

As illustrated in Fig. 5, the position of engagement of the spring teeth of the harrow may be adjusted forwardly or rearwardly by lengthening or shortening the adjustment member 55, this being accomplished by proper rotation of the handle 61. Shortening of the adjustment member 55 pulls forwardly on the upper end of the body 45 and causes the body 45 to rotate forwardly on the axis of the shaft 20. The angular position of the body 45 controls the angular position of the shaft and the parts secured thereto, thus determining that the spring teeth of the harrow will be rotated forwardly in accordance with the rotation of the body 45 and move the points 25 of the harrow teeth relatively rearwardly of the shaft 20 and to project downwardly relative to the ground surface 81.

An additional feature of my invention resides in the provision of a harrow tooth so formed that when it engages materials to be harrowed, a force tending to move the harrow to offset position will be incurred, due to such engagement. As shown in Fig. 1 of the drawings, the points 25 of the teeth 22 and 23 are diagonally cut so as to provide diagonal end faces 89 in a direction corresponding to that in which it is desired to offset the harrow. In addition to this, the rearward or drop portions 90 of the spring teeth are angularly disposed relative to the axes of the shafts on which they are mounted, this angularity being directed in accordance with the end faces or edges 89 of the points 25.

An important and valuable feature of my invention resides in angling the soil-engaging portions of the harrow teeth 22 and 23 in opposite directions so that when these teeth are in engagement with the ground they tend to produce a rotation of the harrow around a central point. This tendency of the teeth to produce rotation of the harrow causes the harrow to swing into an offset position behind the pulling vehicle or tractor. The teeth 22 of the front harrow teeth are angled leftwardly in forward direction, and the teeth 23 of the rear set of harrow teeth are angled in rightward direction. The ground engagement portions of these teeth, such as the diagonal end faces 89 thereof are tangential to an arc indicated by a dotted line 100. Should the harrow be forced in forward direction without restraint, the cooperating front and rear teeth 22 and 23 would tend to follow circular paths such as indicated by the arc 100; but, where the harrow is restrained from such circular movement, such as by the attachment of the draft member 17 to a vehicle, the forces incurred in the harrow cause it to swing rightwardly into an offset following position. The amount of offset of the harrow may be varied by changing the angles of the ground-engaging portions of the harrow teeth 22 and 23 so that they will be disposed on an arc of either a smaller or larger circle, depending on whether the offsetting tendency of the harrow is to be increased or reduced. Most harrows are employed in positions offset to the right, or positive direction relative to the tractor. To obtain this offset the harrow teeth of the forward set of harrow teeth are angled in leftward or negative direction, and the teeth of the rear set of harrow teeth are angled in rightward or positive direction, as shown. Where it is desired to offset the harrow to the left of the tractor the angling of the front and rear harrow teeth must be reversed.

This principle of construction applies to harrows having rigid teeth as well as to those having spring teeth as shown in the accompanying illustrations.

Although I have described in detail the preferred form of my invention, it will be evident that various changes, additions, modifications and substitutions may be made therein without departing from the spirit of the invention or the scope of the appended claims.

I claim as my invention:

1. A cultivator of the character described, including: a frame; a horizontal shaft member rotatably held by said frame; a plurality of tooth members projecting from said shaft member substantially in alignment, said tooth members having peripheral edges substantially defining circles lateral to the axis of said shaft member; latch means for holding said shaft member from rotation and in such position that said tooth members will project downwardly; releasing means for releasing said latch means so as to permit rotation of said shaft member; and a wheel segment on said shaft member adapted to rotate into engagement with the ground as said tooth members rotate out of engagement with the ground when said releasing means is actuated to release said latch means, said wheel segment defining a circle of substantially the diameter of the above named circle.

2. A cultivator of the character described, including: a frame; a horizontal shaft member rotatably held by said frame; a plurality of circularly formed spring tooth members projecting from said shaft member substantially in alignment; latch means for holding said shaft member from rotation and in such position that said tooth members will project downwardly; releasing means for releasing said latch means so as to permit rotation of said shaft member; and a wheel segment extending from said shaft member in direction opposite to said tooth members so as to rotate into engagement with the ground as said tooth members rotate out of engagement with the ground when said releasing means is actuated to release said latch means, said wheel segment and the lower halves of said tooth members approximately defining a cylinder concentric with the axis of said shaft member.

3. A cultivator of the character described, including: a frame; a horizontal shaft member rotatably held by said frame; a plurality of tooth members projecting from said shaft member substantially in alignment, said tooth members having peripheral edges substantially defining circles lateral to the axis of said shaft member; latch means for holding said shaft member from rotation and in such position that said tooth members will project downwardly; releasing means for releasing said latch means so as to permit rotation of said shaft member; and a wheel segment near each end of said shaft member adapted to rotate into engagement with the ground as said tooth members rotate out of engagement with the ground when said releasing means is actuated to release said latch means, said wheel segment defining a circle of substantially the diameter of the above named circles.

4. A cultivator of the character described, including: a frame; a horizontal shaft member rotatably held by said frame; a plurality of circularly formed spring tooth members projecting from said shaft member substantially in alignment; latch means for holding said shaft member from rotation and in such position that said tooth members will project downwardly; releasing means for releasing said latch means so as to permit rotation of said shaft member; and a pair of wheel segments in spaced relationship on said shaft member and extending from said shaft member in direction opposite to said tooth members so as to rotate into engagement with the ground as said tooth members rotate out of engagement with the ground when said releasing means is actuated to release said latch means, said wheel segments and the lower halves of said tooth members approximately defining a cylinder concentric with the axis of said shaft member.

5. A cultivator of the character described, including: a frame; a horizontal shaft member rotatably held by said frame; a plurality of tooth members projecting from said shaft member substantially in alignment; latch means for holding said shaft member from rotation and in such position that said tooth members will project downwardly, said latch means being movable forwardly and rearwardly to vary the position in which said shaft member and said tooth members are held stationary by said latch means; a screw connecting said latch means with said frame for moving said latch means; releasing means for releasing said latch means so as to permit rotation of said shaft member; and a pair of wheel segments in spaced relationship on said shaft member and extending from said shaft member in direction opposite to said tooth members so as to rotate into engagement with the ground as said tooth members rotate out of engagement with the ground when said releasing means is actuated to release said latch means.

6. A cultivator of the character described, including: a frame; a horizontal shaft member rotatably held by said frame; a plurality of circularly formed spring tooth members projecting from said shaft member substantially in alignment; latch means for holding said shaft member from rotation and in such position that said tooth members will project downwardly, said latch means being rotatable on the axis of said shaft member to vary the position in which said shaft member and said tooth members are held stationary by said latch means; means for rotating said latch means to a desired position of adjustment; releasing means for releasing said latch means so as to permit rotation of said shaft member; and a pair of wheel segments in spaced relationship on said shaft member and extending from said shaft member in direction opposite to said tooth members so as to rotate into engagement with the ground as said tooth members rotate out of engagement with the ground when said releasing means is actuated to release said latch means, said wheel segments and the lower halves of said tooth members approximately defining a cylinder concentric with the axis of said shaft member.

7. A cultivator of the character described, including: a frame; a horizontal shaft member extending across said frame; bearing means for rotatably supporting said shaft member on said frame; tooth member projecting downwardly from said shaft member; wheel segments projecting upwardly from said shaft member; a latch disk on said shaft member and rotatable therewith; a latch support rotatable on the axis of said shaft member in position cooperative with said latch disk; means for securing said latch support in a desired rotational position; a screw extending from said frame to said latch support for partly rotating said support; latch means carried by said latch support adapted to engage said latch disk so as to hold said shaft member stationary with said tooth members projecting downwardly and also to engage said latch disk so as to hold said wheel segments in downward position; and a member for releasing said latch means from engagement with said latch disk.

8. A latch device of the character described, including: a pair of relatively movable members, one of said members being the primary member and the other of said members being the secondary member; a projection on said primary member; a pair of outwardly movable stop members on said secondary member disposed on opposite sides of said projection to prevent movement thereof; and means associated with said stop members for forcing one of said stop members relatively inwardly when the other of said stop members is moved outwardly.

9. A latch device of the character described, including: a pair of relatively movable members, one of said members being the primary member and the other of said members being the secondary member; a projection on said primary member; a pair of outwardly movable stop members on said secondary member disposed on opposite sides of said projection to prevent movement thereof; means associated with said stop members for forcing one of said stop members relatively inwardly when the other of said stop members is moved outwardly; and means associated with said stop members for moving one of said stop members out of engagement with said projection to permit relative movement of said primary and secondary members.

10. A latch device of the character described, including: a rotary member; a relatively stationary member; a lug on said rotary member; a pair of stop members movably mounted on said relatively stationary member, said stop members having engagement portions positioned to lie on opposite sides of said lug so as to prevent movement thereof; and means for lifting one of said stop members to release said lug and permit rotation of said rotary member in forward direction, the other of said stop members remaining stationary in a position to prevent rearward rotation of said rotary member.

11. A latch device of the character described, including: a rotary member having a latch lug thereon; a stationary member providing track means; a pair of stop bars slidable in said track means into positions of engagement with opposite sides of said latch lug, the first of said stop bars having a sloping approach on the engagement end thereof to permit said latch lug to move into position between the engagement portions of said stop bars; means for lifting the second of said latch bars from engagement with said latch lug; and means for moving said second latch bar automatically back into position for engaging said latch lug when said latch lug moves said first stop member by traversing the sloping approach of said stop member.

12. A cultivator of the character described, including: a frame; front and rear horizontal shaft members rotatably held by said frame; a plurality of tooth members projecting from said shaft members substantially in alignment; latch means for holding said shaft members from rotation and in such position that said tooth members will project downwardly, said latch means being movable forwardly and rearwardly to vary the position in which said shaft members and said tooth members are held stationary by said latch means; releasing means for releasing said latch means so as to permit rotation of said shaft members; a wheel segment on each of said shaft members adapted to rotate into engagement with the ground as said tooth members rotate out of engagement with the ground when said releasing means is actuated to release said latch means; front and rear cranks formed on said front and rear shaft members; and links extending between said front cranks and said rear cranks for producing positive synchronous rotation of said shaft members.

13. A cultivator of the character described, including: a frame; front and rear horizontal shaft members rotatably held by said frame; a plurality of tooth members projecting from said shaft members substantially in alignment; latch means associated with one of said shaft members for holding said shaft members from rotation and in such position that said tooth members will project downwardly, said latch means being movable forwardly and rearwardly to vary the position in which said shaft members and said tooth members are held stationary by said latch means; releasing means for releasing said latch means so as to permit rotation of said shaft members; a wheel segment on each of said shaft members adapted to rotate into engagement with the ground as said tooth members rotate out of engagement with the ground when said releasing means is actuated to release said latch means; front and rear cranks formed on said front and rear shaft members; and links extending between said front cranks and said rear cranks for producing positive synchronous rotation of said shaft members.

14. A cultivator of the character described, including: a frame; a horizontal shaft member rotatably held by said frame; a plurality of tooth members projecting from said shaft member substantially in alignment; latch means for holding said shaft member from rotation and in such position that said tooth members will project downwardly, said latch means positively preventing rearward rotation and being releasable only to permit forward rotation of said shaft member; releasing means for releasing said latch means so as to permit forward rotation of said shaft member; and a wheel segment on said shaft member adapted to rotate into engagement with the ground as said tooth members rotate out of engagement with the ground when said releasing means is actuated to release said latch means.

15. A cultivator of the character described, including: a frame; a horizontal shaft member rotatably held by said frame; a plurality of tooth members projecting from said shaft member substantially in alignment; latch means for holding said shaft member from rotation and in such position that said tooth members will project downwardly, said latch means having a forward latching part and a rearward latching part respectively adapted to prevent rotation of said shaft member in forward and rearward directions; releasing means for releasing said forward latching part so as to permit forward rotation of said shaft member; and a wheel segment on said shaft member adapted to rotate into engagement with the ground as said tooth members rotate out of engagement with the ground when said releasing means is actuated to release said latch means.

16. A cultivator of the character described, including: a frame; a horizontal shaft member rotatably held by said frame; a plurality of tooth members projecting from said shaft member substantially in alignment, said tooth members having peripheral edges substantially defining circles lateral to the axis of said shaft member; latch means for holding said shaft member from rotation either forwardly or rearwardly while said shaft member is in such position that said tooth members will project downwardly; releasing means for releasing said latch means so as to permit rotation of said shaft member; and a wheel segment on said shaft member adapted to rotate into engagement with the ground as said tooth members rotate out of engagement with the ground when said releasing means is actuated to release said latch means, said wheel segment defining a circle of substantially the diameter of the above named circles.

17. A cultivator of the character described, including: a frame; a horizontal shaft member rotatably held by said frame; a plurality of tooth members projecting from said shaft member substantially in alignment; latch means for holding said shaft member from rotation either forwardly or rearwardly while said shaft member is in such position that said tooth members will project downwardly; releasing means for releasing said latch means so as to permit rotation of said shaft member; and a wheel segment on said shaft member adapted to rotate into engagement with the ground as said tooth members rotate out of engagement with the ground when said releasing means is actuated to release said latch means.

18. A cultivator of the character described, including: a frame; a horizontal shaft member rotatably held by said frame; a plurality of tooth members projecting from said shaft member substantially in alignment; latch means for holding said shaft member from rotation either forwardly or rearwardly while said shaft member is in such position that said tooth members will project downwardly, said latch means being movable forwardly and rearwardly to vary the position in which said shaft member and said tooth members are held stationary by said latch means; releasing means for releasing said latch means so as to permit rotation of said shaft member; and a wheel segment on said shaft member adapted to rotate into engagement with the ground as said tooth members rotate out of engagement with the ground when said releasing means is actuated to release said latch means.

19. A cultivator of the character described, including: a frame; front and rear horizontal shaft members rotatably held by said frame; a plurality of tooth members projecting from said shaft members substantially in alignment; latch means for holding said shaft members from rotation either forwardly or rearwardly while said shaft members are in such position that said tooth members will project downwardly, said latch means being movable forwardly and rearwardly to vary the position in which said shaft members and said tooth members are held stationary by said latch means; releasing means for releasing said latch means so as to permit rotation of said shaft members; a wheel segment on each of said shaft members adapted to rotate into engagement with the ground as said tooth members rotate out of engagement with the ground when said releasing means is actuated to release said latch means; front and rear cranks formed on said front and rear shaft members; and links extending between said front cranks and said rear cranks for producing positive synchronous rotation of said shaft members.

20. A cultivator of the character described, including: a frame; front and rear horizontal shaft members rotatably held by said frame; a plurality of tooth members projecting from said shaft members substantially in alignment; latch means for holding said shaft members from rotation and in such position that said tooth members will project downwardly; releasing means for releasing said latch means so as to permit rotation of said shaft members; a wheel segment on each of said shaft members adapted to rotate into engagement with the ground as said tooth members rotate out of engagement with the ground when said releasing means is actuated to release said latch means; front and rear cranks formed on said front and rear shaft members; and links extending between said front cranks and said rear cranks for producing positive synchronous rotation of said shaft members.

In testimony whereof, I have hereunto set my hand at Los Angeles, California, this 25th day of March, 1930.

JAMES S. STEWART.